United States Patent [19]
Lonsdale et al.

[11] Patent Number: 5,585,571
[45] Date of Patent: Dec. 17, 1996

[54] METHOD AND APPARATUS FOR MEASURING STRAIN

[76] Inventors: Anthony Lonsdale; Bryan Lonsdale, both of Balscote Mill, Balscote, Banbury OX15 6JB, United Kingdom

[21] Appl. No.: 923,960

[22] PCT Filed: Mar. 4, 1991

[86] PCT No.: PCT/GB91/00328

§ 371 Date: Oct. 15, 1992

§ 102(e) Date: Oct. 15, 1992

[87] PCT Pub. No.: WO91/13832

PCT Pub. Date: Sep. 19, 1991

[30] Foreign Application Priority Data

Mar. 3, 1990 [GB] United Kingdom ............... 9004822

[51] Int. Cl.$^6$ ........................................ G01L 3/02
[52] U.S. Cl. ............... 73/862.325; 73/862.321; 73/DIG. 4
[58] Field of Search .............. 73/862.325, 862.321, 73/DIG. 4; 310/313 B, 317, 318, 337, 338

[56] References Cited

U.S. PATENT DOCUMENTS

| | | | |
|---|---|---|---|
| 3,555,394 | 1/1971 | Bratkowski | 73/862.338 X |
| 3,878,477 | 4/1975 | Dias et al. | 73/DIG. 4 |
| 4,096,740 | 6/1978 | Sallee | 73/DIG. 4 |
| 4,100,811 | 7/1978 | Cullen et al. | 73/DIG. 4 |
| 4,107,626 | 8/1978 | Kiewit | 73/DIG. 4 |
| 4,573,357 | 3/1986 | Meunier | 73/DIG. 4 |
| 4,623,813 | 11/1986 | Naito et al. | 73/DIG. 4 |

FOREIGN PATENT DOCUMENTS

| | | |
|---|---|---|
| 2553884 | 4/1985 | France . |
| 2950891 | 6/1981 | Germany . |
| 55-52912 | 6/1980 | Japan . |
| 59-60332 | 7/1984 | Japan . |

OTHER PUBLICATIONS

Radio, Fernsehen Elektronik, vol. 34, No. 8, Aug. 1985, (Ost–Berlin, DE), R. Thoma et al.: "Sensoren auf der Grundlage akustischer Oberflachenwellen", pp. 480–483.

Primary Examiner—Richard Chilcot
Assistant Examiner—Elizabeth L. Dougherty
Attorney, Agent, or Firm—Davis, Bujold & Streck, P.A.

[57] ABSTRACT

A method of, and apparatus for, measuring dynamic torque transmitted by a shaft having an axis of rotation is characterised by the steps of:

1 locating on the shaft (S) a pair of transducers (T, T1, T2), each comprising an SAW resonator, as a complementary pair so that for a first direction of rotation (K) of the shaft (S) about the axis (A) one transducer (T1) is under compression and the other (T2) in tension and for a reverse direction of rotation of the shaft the one transducer (T1) is in tension and the other (T2) in compression, a signal input (C1) and a signal output (C2, C3) for either each transducer or a single signal output for a signal derived from both transducers, the signal input and signal output or outputs being located at discrete locations on or near the outside of the shaft (S) for rotation therewith, 2 causing a driving signal to be applied to the signal input (C1);

3 detecting at each or the signal outlet (C2, C3) at least an output resonant frequency of the transducer (T, T1, T2) when driven by the driving signal; and 4 processing the output resonant frequency signal of each or both transducers to derive information as to the strain generated in the transducer (T1, T2) induced by stress in the shaft (S) due to dynamic torque transmitted by the shaft (S). The invention further provides for various output signals to be provided relating to dynamic torque with or without temperature compensation and/or representation.

7 Claims, 7 Drawing Sheets

METHOD AND APPARATUS FOR MEASURING STRAIN

BACKGROUND

This invention relates to a method and apparatus for measuring strain arising from stress. Many applications call for strain measurement including static and dynamic loading of structures and components and for the subsequent derivation of information from such measurement. The present invention is particularly, but not exclusively, concerned with the measurement of dynamic torque arising when power is transmitted by way of a rotating shaft.

TECHNICAL FIELD

For the measurement of static and dynamic strain conventional resistive strain gauges are widely used. They are characterised by resistive elements incorporated into bridge circuit so that changes in resistive elements due to stress in components to which at least some of the elements are secured are quantified by way of the bridge circuit.

Torque Measurement

A resistive strain gauge can be used for measurement of torque transmitted by a shaft to which the gauge are securely attached. Slip rings on the shaft are used to feed signal inputs to and to recover signal outputs from the gauge. Changes in the geometry of the gauge arising from twisting of the shaft during torque transmission are monitored by way of the slip rings. However the use of slip rings has a number of disadvantages. Brush drag on the slip rings produces errors which are significant for measurement of signals representing lower torque values and drag can vary with the friction conditions and as wear occurs. Inertia effects limit the acceleration to which the shaft bearing the slip rings can be subjected. The rings and brushes generate electrical noise.

The measurement of torques can extend from on the one hand the very small torques arising from viscosity associated with the use of small scale laboratory mixers to, on the other hand, the very large torques occurring in transmission shafts of aero and marine propulsion units. It has been found that in general slip ring systems are not readily applied to the measurement of torque of less than about 2 Newton meter. Typically the diameter of the gauge section of a shaft becomes so small that insufficient area is available to provide for the mounting of strain gauge of suitable size and the size of the electrical noise generated results in a signal to noise ratio which prejudices effective use. At the other extreme on very large shafts the use of slip rings and the associated equipment can lead to access and housing problems.

As an alternative to resistive strain gauges optical torque transducers have become available for the purposes of shaft torque measurement. In an optical transducer radially extending segmented gratings are mounted on the shaft. Output from an array of light sources passes through the gratings to fall on a bank of photocells. The signal output from the photocells varies directly with the torque applied to the shaft. Accuracy of measurement is unaffected by the shaft speed or the torque range. The intensity of the light sources can be monitored to ensure that photocell output does not vary due to light source variation.

Currently these optical/electronic gauges are widely used for torques extending in ranges from 0 to 10 milli Newton meters to 0 to 5000 Newton meters and for rotational speed between 0.5 to 30000 rpm. While the technical advantages of the optical electronic systems are substantial they are costly. In particular the segmented gratings are expensive to manufacture. In addition a periodic need to replace lights in the array imposes a design constraint inasmuch as the gauge needs to be accessible for maintenance and calibration.

BACKGROUND ART

In what follows reference is made to a 'surface acoustic wave resonator'. Such a resonator is made up of a microstructure deposited on a piezoelectric substrate. The microstructure is formed by at least one pair of interleaved comb-like ('interdigitated') electrodes deposited as a thin metal conducting layer on the substrate. FIG. 15 shows a basic model of a surface acoustic wave device 10 having input electrode 11 interleaved with output electrode 12. The electrodes are a deposit of aluminum (other good conductors can be used) having a thickness of the order of 1000 Angstroms. The electrodes 11, 12 are deposited on upper surface 14 of a piezoelectric substrate 13. Many piezoelectric materials are suitable for a substrate from flexible plastic polymers to hard materials such as ceramic and quartz. Various piezo electric crystal forms can be used such as lithium niobate, lithium tantalate, bismuth germanlure oxide and gallium oxide. Hereafter such a surface acoustic wave device will be referred to as an 'SAW resonator'.

In an SAW resonator the application of an electric signal to one electrode in the pair causes it to act as a transducer converting the electrical input signal into an outgoing acoustic wave on the substrate. The other electrode in the pair reverses the process providing an electrical output signal with the arrival of an acoustic wave on the substrate.

An SAW resonator acts as a 'high Q' device that is to say one in which the selectivity of the circuit is high and narrows the bandwidth passed by the circuit. SAW resonators are among a number of surface acoustic wave devices which are widely used in signal processing applications such as delay lines, frequency filters, bandpass filters, oscillators, duplexers and convolvers. SAW devices are the subject of current research and development. A number of publications are available including 'Surface Acoustic Wave Devices and Their Signal Processing Applications' by Colin Campbell (1989 Edition) published by Academic Press, Incorporated of San Diego, Calif. USA.

DISCLOSURE OF THE INVENTION

In its broadest concept the present invention is concerned with a method and apparatus of strain measurement utilising an SAW resonator. In a given fundamental unstrained state of the substrate and the electrodes mounted upon it a signal input fed to the input electrode results in the transmission of a surface acoustic wave to the output electrode with a characteristic resonant frequency output signal from the output electrode. In the event the substrate is subject to strain then the consequent change in the relative geometry of the electrode array results in the resonant output frequency being subject to change which can be detected and related to the amplitude of the strain or a function of it. This is capable of wide application since given a source of stress which can be transmitted into strain in the substrate the source can analysed by way of signal changes resulting from geometry changes in the SAW transducer.

The operational frequencies of an SAW resonator can be selected anywhere in a wide frequency range extending from a few megahertz up to few gigahertz. The higher the frequency used the smaller the envelope required for the transducer which can be of particular benefit in strain related applications where available space is limited. The resonant frequency used depends on a number of factors including the geometry of the electrodes and properties of the substrate material. The velocity of the surface wave varies with the temperature of the substrate material. The very small sizes in which an SAW resonator can be made facilitates its use as a strain measuring device in a wide range of applications.

Coupling between the electrodes can be by 'surface acoustic' (also known as Rayleigh) waves. For such waves the substrate needs to have a smooth propagation surface for two reasons in particular. Firstly surface defects could cause breaks in individual parts of the electrodes affecting frequency response. Secondly the surface wave energy is concentrated within a layer one or two wavelengths thick.

Another acoustic propagation mode which can be used to couple the electrodes are 'surface skimming bulk' waves. These extend more deeply into the substrate than the surface acoustic waves and consequently the surface skimming bulk waves have higher losses than arises with the surface acoustic mode. However the bulk waves are less sensitive to defects in the substrate surface.

The choice of operating mode will depend on the strain measurement to be undertaken.

An SAW resonator can be used in a system where signal inputs to the transducer input and signal outputs from the transducer are transmitted by non-contact coupling (such as by inductive, capacitative or radio wave means) to an external control system. The provision of a non-contact coupling where the electrodes have no direct electrical connection provides a number of advantages particularly when there is a need for intrinsic safety or where physical connection would affect the resonance to be measured. Such non-contact systems are particularly convenient for rotating mechanisms. An SAW transducer can be used in place of a resistive strain gauge. In any event an SAW strain transducer is capable of a degree of accuracy substantially greater than that of a conventional resistive strain gauge.

The electrode array in an SAW resonator can take a number of forms though all provide for an accurate and specific relationship between operating frequency and electrode geometry.

A single port SAW resonator requires only two connections for operation. Conveniently such a transducer is used with an amplifier having a negative input resistance characteristic so that a state of oscillation can be maintained by an impedance change in the SAW resonator.

A two-port resonator has lower losses than a corresponding single port type, can be made to operate in a multi-mode fashion and has advantages with regard to phase shift making it applicable to high precision applications.

An SAW resonator transducer according to the present invention can be used in a wide range of applications and some of these will now be briefly described.

LOAD MEASUREMENT

The present invention is applicable for measuring the magnitude of rotary and static loads. If an article which is to be the subject of loads comprises or incorporates a piezoelectric material then an SAW resonator electrode array can be deposited upon an area of the material to form an integral transducer. Two or more such transducers can be used as will be described hereafter in connection with torque measurement.

PRESSURE MEASUREMENT

The present invention particularly lends itself to measurement of pressure by utilising a non-contact transmission of signal input and output from a static interrogating unit, such as a vehicle body, to a transducer located on a moving component, such as an inflated road tire of the vehicle. In this way pressure and other parameters, such as wear, can be periodically or continuously monitored.

TEMPERATURE MEASUREMENT

Evaluating temperature in connection with torque measurement will be discussed later in relation to processing output signals from two or more SAW transducers. The invention can be used in connection with a bi-metallic strip where the coefficient of expansion of one metal making up the strip differs from that of the other. In the event of a temperature change the strain on one side of the strip will be compressive and on the other side tensile. Consequently by mounting an SAW resonator on each strip the frequency difference between their outputs will be the representative of the ambient temperature due to material strain. Alternatively the sum of the frequencies will be a measure of temperature due to material expansion. For such a device operating power levels lower than 1 mW can be used which, in combination with a non-contact coupling, would meet intrinsic safety requirements.

GYROSCOPIC DEVICE

If a hemisphere is brought to a resonant condition and rotated it is known that an imposed strain pattern will also rotate relative to the hemisphere at one third of the rate of rotation. During resonance opposite points on the hemisphere move outwardly while opposite points 90 degrees around the rim move inwardly. The process then reverses. By locating SAW resonators at 90 degree separation around the hemisphere this strain can be detected by one resonator in compressive strain and the other in tensile strain to establish the null position. Such a gyroscopic device has a number of navigational and guidance applications. In particular given that the hemisphere is normally manufactured in a piezoelectric material (such as quartz or a ceramic) it would be possible to deposit electrode array directly onto the hemisphere material. As a consequence the strain and temperature information derived from such an assembly could be used to improve the performance of gyroscopic devices.

MAGNETIC FIELD MEASUREMENT

A device according to the invention can be used in a method of measurement of magnetic fields by detecting strain differences in an elastic piezoelectric material (such as quartz) which is subject to strains induced by reactive Laplace forces produced by current flow in a conductor placed on the material. Such strains are orthogonal to the magnetic field, In practice the strain is converted to a current of proportional amplitude and phase. This in turn induces strain which would in turn produce feedback whose frequency would be proportional to the magnetic field. Such a device is a vector magnetometer and three such devices placed orthogonally would be required for total field measurement. One advantage of such a device would be the inherent stability for both temperature and time dependent factors of piezoelectric materials such as quartz. Other materials, such as gallium arsenide, which are both piezoelectric and a semiconductor provide for the integration of electronic amplifiers or other circuit elements to be integrated into a transducer in addition to the SAW resonating elements.

BRIEF DESCRIPTION OF DRAWINGS

A number of exemplary embodiments of the present invention will now be described with reference to the accompanying drawings of which.

DESCRIPTION OF THE EXEMPLARY EMBODIMENTS

The following exemplary embodiments described in relation to FIGS. 1 to 9 show the use of one or more SAW resonators to measure dynamic torque. The features discussed are also applicable to other applications.

To measure torque requires that the substrate of the, or each, resonator is securely attached to the shaft or other strain transmitting member under test. This can either be directly or by way of an interface between the substrate and the test piece such as might be needed, for example, where the resonator is encapsulated for protection of the resonator components against a hostile environment. Torque (radial strain) is measured by a change in the output frequency of the resonator arising from a change in shape of the substrate element and so in the relative positions of the electrodes deposited upon the substrate. The radial strain is induced by the stress in the shaft under test and is proportional to the applied torque.

FIG. 1

This shows a shaft S to which has been secured the substrate of an SAW resonator transducer T. The centreline C of the transducer T is located at 45 degrees to longitudinal axis A of the shaft S. If the applied torque is applied clockwise from the right hand end of the shaft S (as shown by arrow K) the transducer T is placed in tension. If the torque direction was reversed the transducer T is placed in compression.

FIG. 2

Figure 1:
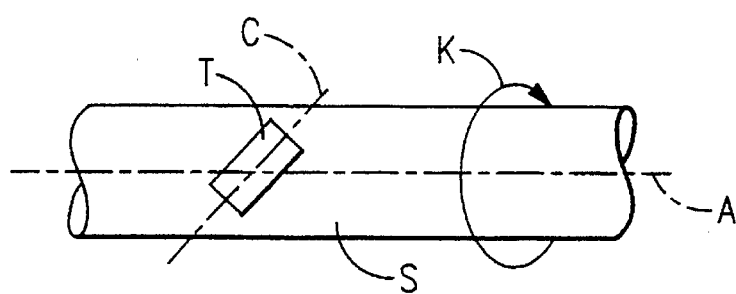
FIGS. 1 is a diagrammatic view of a transducer forming a first embodiment.
Figure 2:
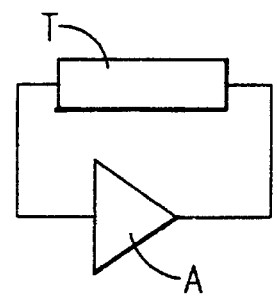
FIG. 2 is a circuit diagram of a transducer similar to those described in connection with FIGS. 1 combined with an amplifier.

Transducer T of the type shown in FIG. 1 is connected with an amplifier A. The circuit will oscillate at a given frequency when the amplifier provides for the correct phase shift for, and with enough gain to overcome losses occurring in, the resonator and coupling.

The temperature coefficient of an SAW resonator can be very low. Its frequency of oscillation can be up to about 1 Giga Hertz ($10^9$ Hz). A typical frequency would be 500 MHz and therefor a change of 0.1% would produce a frequency change of 500 kHz ($5 \times 10^5$ Hz).

FIG. 3

For practical applications two SAW resonator transducers T1 and T2 are mounted as shown on the shaft S with their centrelines C1 and C2 at right angles to one another. Torque applied to the shaft in clockwise direction shown by arrow K will induce compressive stress in transducer T1 and tensile stress in transducer T2. Any temperature changes would apply equally to both elements. An alternative paired arrangement is with the two transducers mounted on opposite sides of the shaft again with their centrelines at right angles to one another (and at 45 degrees to the axis of the shaft).

FIG. 4

Figure 3:
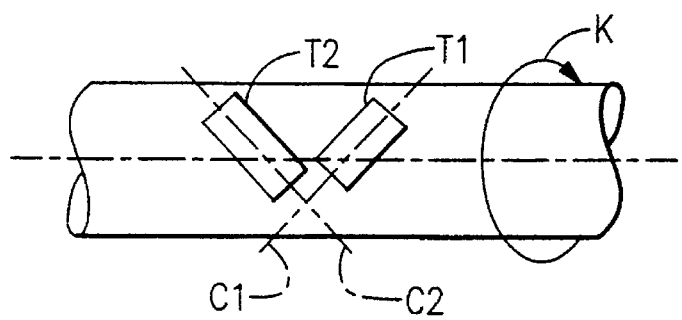
FIG. 3 is a diagrammatic view of a twinned pair of transducers of the type shown in FIG. 1.

A pair of transducers T1 and T2 are mounted on a shaft as shown in FIG. 3. Transducers T1 and T2 are coupled with, respectively, amplifiers A1 and A2 which provide output signal frequencies, respectively, F1 and F2. The output signal are fed to a mixer M having an output F. The output frequency F will be F1+F2 and F1–F2. Ignoring the F1+F2 component a typical frequency difference of 1 MHz would be generated for a change of 0.1% due to applied torque. Output from the transducers is only proportional to torque and with no torque being transmitted F1–F2 will be close to zero. Changes in the geometry of the transducers T1 and T2 due to temperature or endload effects will apply equally to both so that the net result will be zero.

The tensile strength of virtually any material is temperature dependent. Consequently a knowledge of the ambient temperature will enable correction or compensation to be made. Thus the output F, (F1+F2), of mixer M will, if compared with a reference, produce a signal frequency proportional to temperature of the material to which the substrate of each transducer is attached.

FIG. 5

Figure 4:
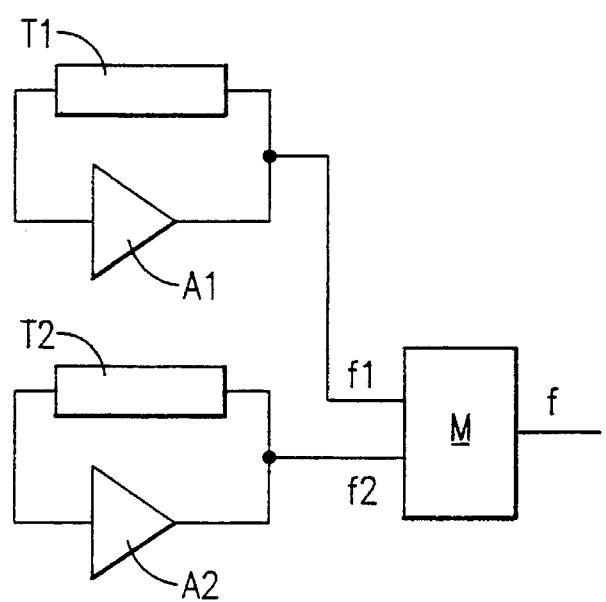
FIG. 4 is a circuit diagram of a twinned pair of transducers similar to those described in connection with FIG. 3 combined with an amplifier.
Figure 5:
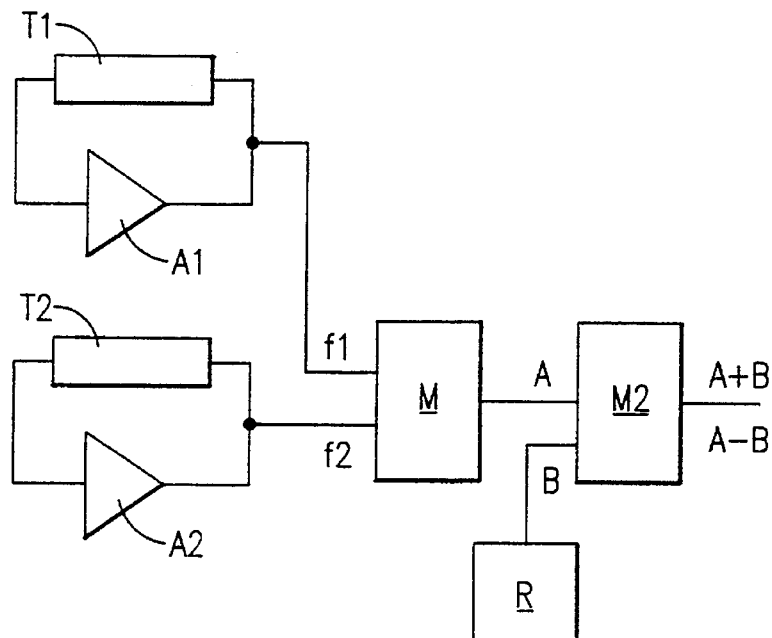
FIG. 5 is a circuit diagram incorporating the components described in connection with FIG. 4 coupled to additional components to provide for compensation and correction.

This circuit incorporates one similar to that of FIG. 4. Components referred to in connection with FIG. 4 are given the same reference in FIG. 5. In addition FIG. 5 shows a further mixer M2 and a reference signal generator R to enable temperature corrections to be applied. Output frequency F1+F2 (=A) of mixer M is fed to mixer M2 together with a signal B, typically 1 GHz, from generator R. As a result mixer M2 provides as output sum A+B or A–B. The difference signal is at a frequency related to temperature and can be used to correct scale factors in precision applications.

As SAW devices operate in ultra high frequency regions finite impedance matching is required to obtain the most efficient coupling. In the present context this amounts to an impedance of the order of 50 ohms. The device described in connection with FIGS. 3, 4 and 5 are directionally insensitive with a typical loss of 18 dB.

FIG. 6

This shows how energy is coupled to each of the SAW resonator transducers T1 and T2 by way of a coil and a probe. Coils C1–C3 are each fitted to the shaft S for rotation with it and are coupled to transducers T1 and T2. The coils can be designed to give more than one peak amplitude per shaft revolution as would be appropriate for low speed applications such as ship propeller shafts. Static probes P1–P3 are mounted adjacent the shaft. The necessary matching impedance is 50 ohms for the coils C1 to C3 and to probes P1 to P3. Amplifiers A1 and A2 must provide adequate gain for their associated circuitry to oscillate taking into account the space loss between each coil and probe combination. Each amplifier is provide with automatic gain control ('AGC') to accommodate reasonable system losses such as can arise from changes in distance between coil and probe. Power dividers R1, R2 serve to regulate frequencies fed to mixer M. The SAW resonators do not have to be harmonically related. Any frequency difference out of mixer M can be reduced by making use of a further mixer.

FIG. 7

Figure 6:
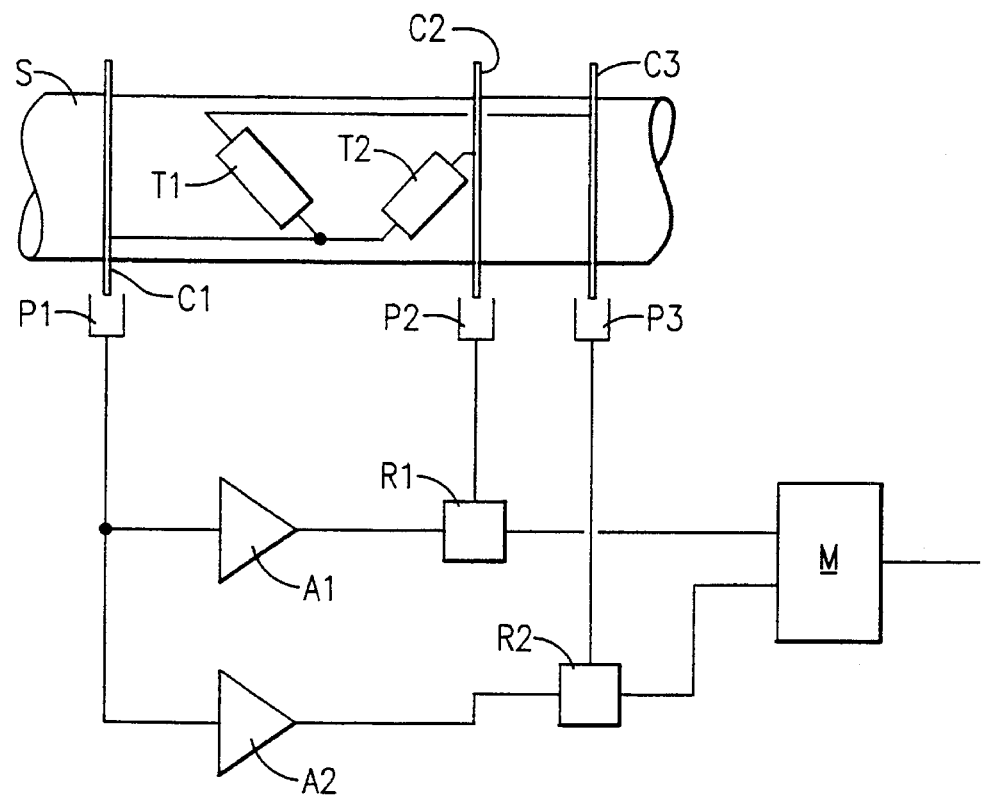
FIG. 6 is a circuit diagram showing the coupling of transducers described in earlier figures to an output device.

This shows a practical embodiment of a control arrangement based on FIG. 6. Since the transducers are positioned on the shaft as shown in FIG. 6 they are consequently not shown in FIG. 7. Coils C1 to C3 serve to transmit signals to probes P1 to P3 as described in connection with FIG. 6.

Diodes D1 and D2 change impedance with applied voltage to provide an AGC effect. On the output voltage from an amplifier increasing it is rectified and used to provide a control current to pin diodes D1, D2 so reducing diode resistance and so causing levelling of the amplifier output which in turn produces a constant frequency output from the resonator.

Further information can be provided from the output of the transducer arrangement. Thus shaft rotational speed can be represented by amplitude modulation of pin diode control current if ciol C1 is made eccentric with respect to the shaft so generating an output related to each shaft revolution. For slowly rotating shafts (such as a ships propeller shaft) a coil or coils can used to generate a number of outputs per shaft revolution (an output for a given angular displacement of the shaft).

FIG. 8

Figure 7:
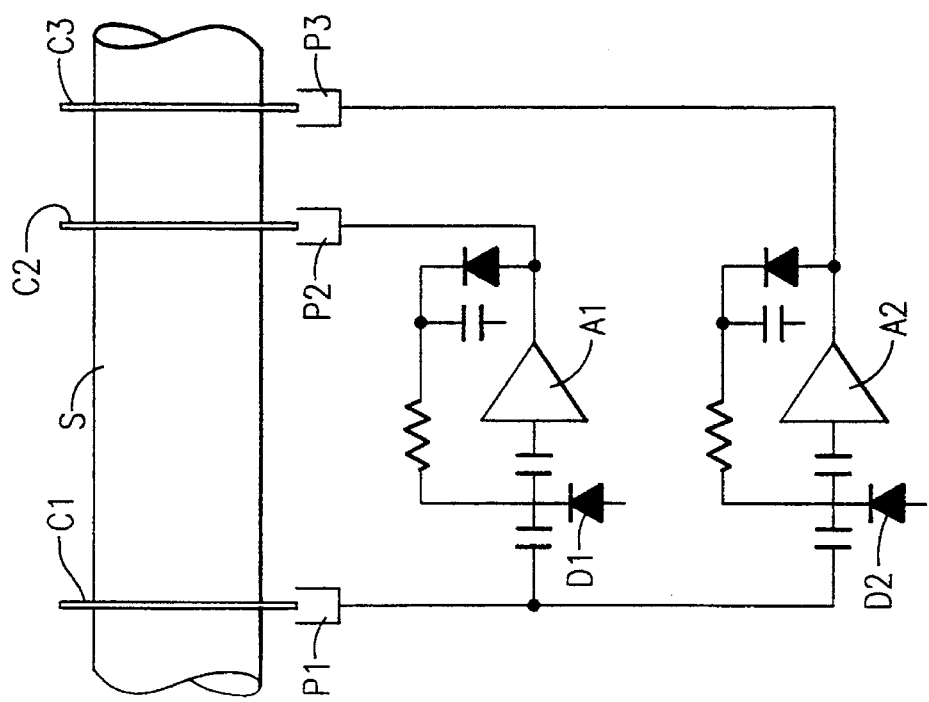
FIG. 7 is an application of the system shown in FIG. 6.

Circuitry shown and described in connection with FIG. 6 and 7 are here combined together with additional features. Where a component shown in FIG. 8 is similar in form and function to one shown in FIG. 6 and/or 7 it is given the same reference.

Shaft S is equipped with transducers T1 and T2 which are coupled by way of coils C1 and C2 and probes P1 and P2 to the remainder of the control circuitry. In this case the output frequency of T1 is 250 MHz and that of transducer T2 500 MHz. Amplifier A1 feeds its output of 250 MHz to frequency doubler D from which an output signal of 500 MHz is fed to Mixer M. Amplifier A2 feeds its output frequency of 500 MHz to mixer M directly. Output of mixer M, representing (500+500) MHz and (500−500) MHz is split. The difference signal (representing a torque signal) is fed directly to a microprocessor MP by way of line 10. The sum signal (providing a temperature signal) is fed to a second mixer M2 by way of line 11. The mixer M2 also receives by way of line 12 a reference input signal of 1 GHz. The output of the mixer M2 representing a temperature signal which is fed by way of line 13 to the microprocessor MP to enable the microprocessor to provide for a temperature compensated output. As a consequence the microprocessor MP provides an output to display W showing the speed of rotation, the transmitted torque, and the power transmitted by the shaft S under test with due temperature compensation.

Figure 8:
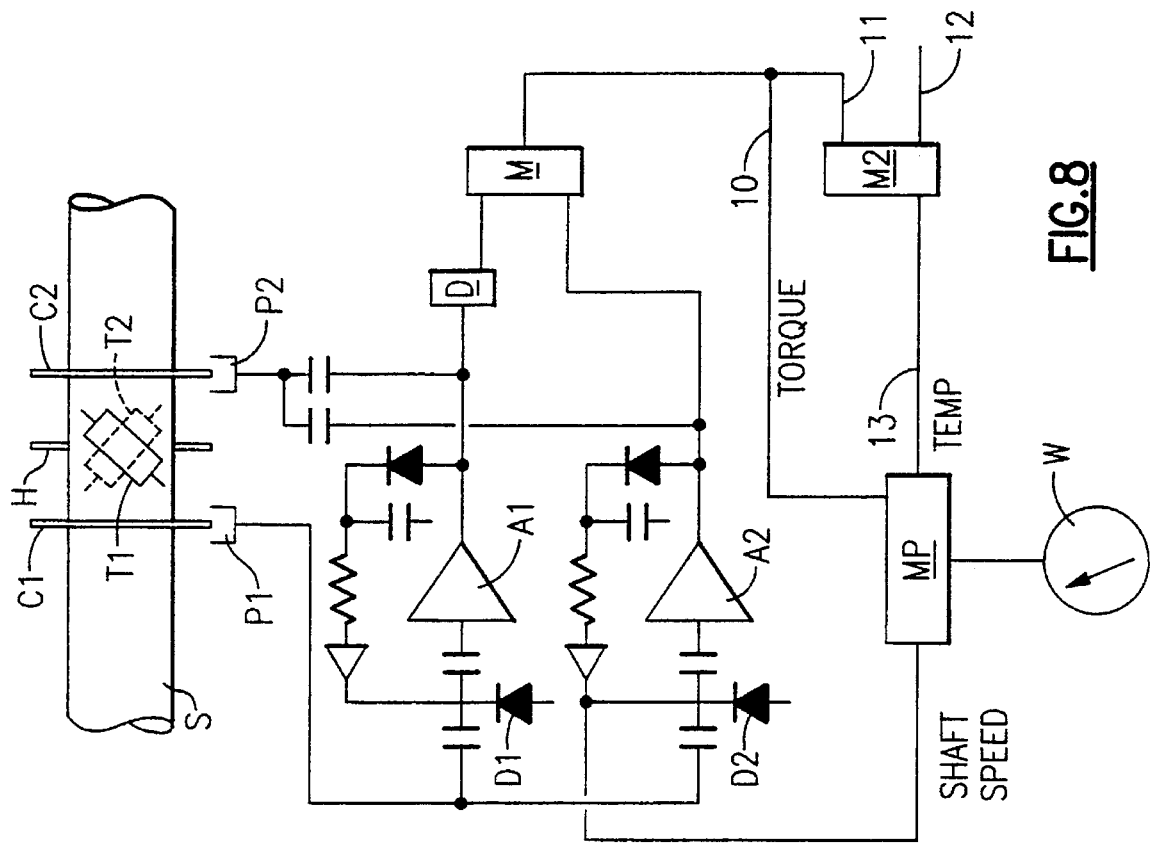
FIG. 8 is a further development of the circuitry described in connection with FIG. 7.

The transducer pairs shown in FIGS. 3, 6 and 8 are mounted at 90 degrees to one another and 45 degrees to the shaft. Other mounting angles can be used. Typically to enable shaft load measurements to be checked the two transducers while being mounted at right angles to one another could be mounted with one transducer parallel to the axis of the shaft. In this way the transducer parallel to the shaft axis will be sensitive to the effect of axial loads on the shaft.

The embodiments make use of probe/coil coupling between the shaft mounted transducers and the control circuitry. However for use in static measurements the transducers could be coupled by wires to the control circuitry.

FIG. 9

Figure 9:
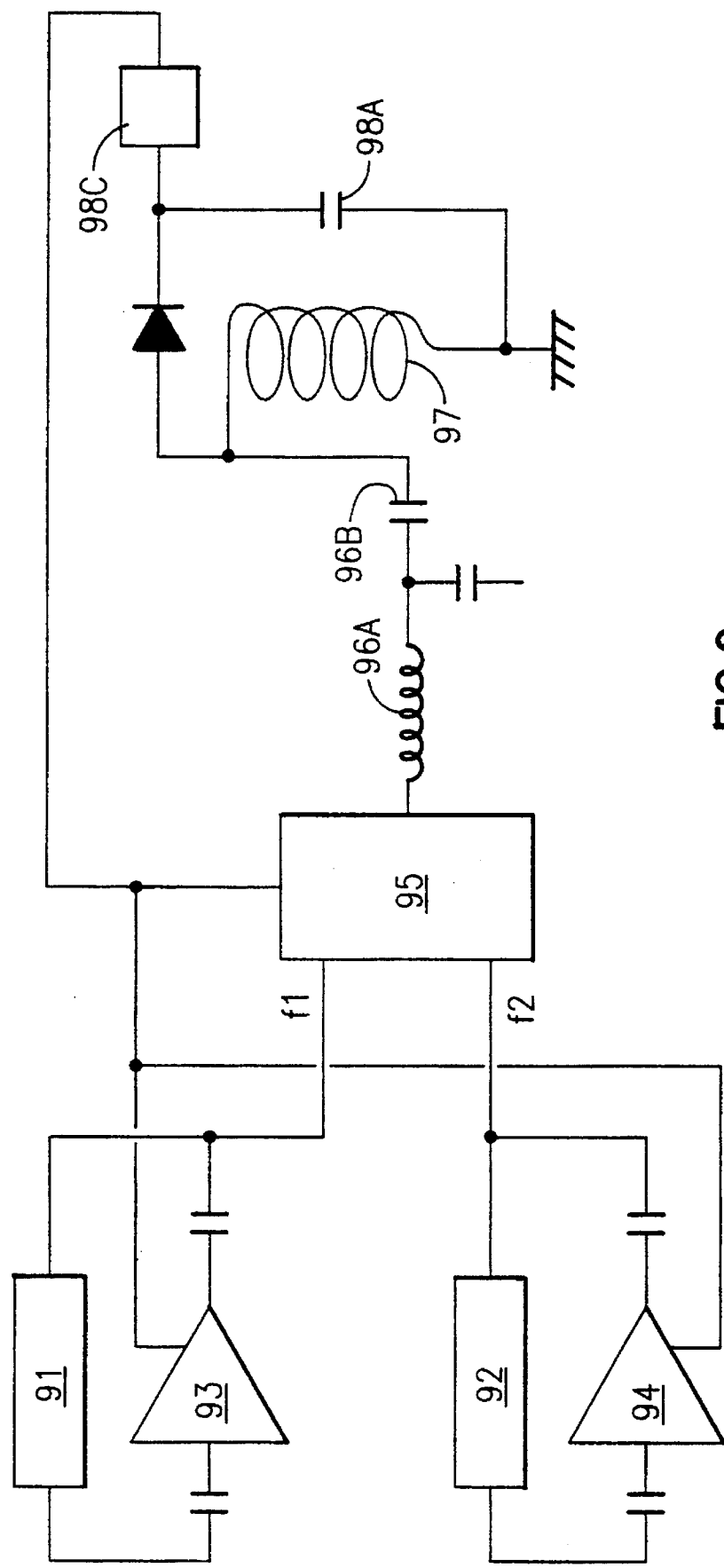
FIG. 9 is circuit diagram of an integrated microcircuit unit related to that shown in FIG. 5.

A method used to ensure that an acoustic wave resonator operates correctly must provide for adequate gain and phase stability. These require close control of circuit parameters including coil coupling characteristics. Such control is readily met in a purpose built transducer. However where the resonator has to be added to an existing mechanical assembly further components such as a torque or load sensor have to be added. A solution is to combine the required electronics with the acoustic wave resonator unit itself. FIG. 9 shows a circuit diagram for such a combined unit which incorporates SAW resonators 91, 92, amplifiers 93, 94 and mixer 95 in a similar way to that discussed in relation to FIG. 4. The output of mixer 95 (at a frequency of about 1 MHz) is fed by way of inductor 96A, capacitor 96B to coil 97 which is coupled by capacitor 98A, diode 98B and impedance 98C to provide a DC supply to mixer 95 and the amplifiers 93, 94. Electrical energy is coupled from an external source by way of coil 97 and duly rectified and regulated by way of capacitor 98A, diode 98B and impedance 98C. Frequency f1 from amplifier 93 and frequency f2 from amplifier 94 are mixed in mixer 95 whose output is returned to coil 97. There would normally be a significant frequency difference between the excitation source and the return signal from mixer 95. The use of a micro circuit enables the relevant electronics to be housed in the same envelope as the resonators 91, 92. Such a package provides a readily added component for attachment to an existing shaft or other mechanism subject to strain which is to be measured.

FIG. 10, 11

Figure 10:
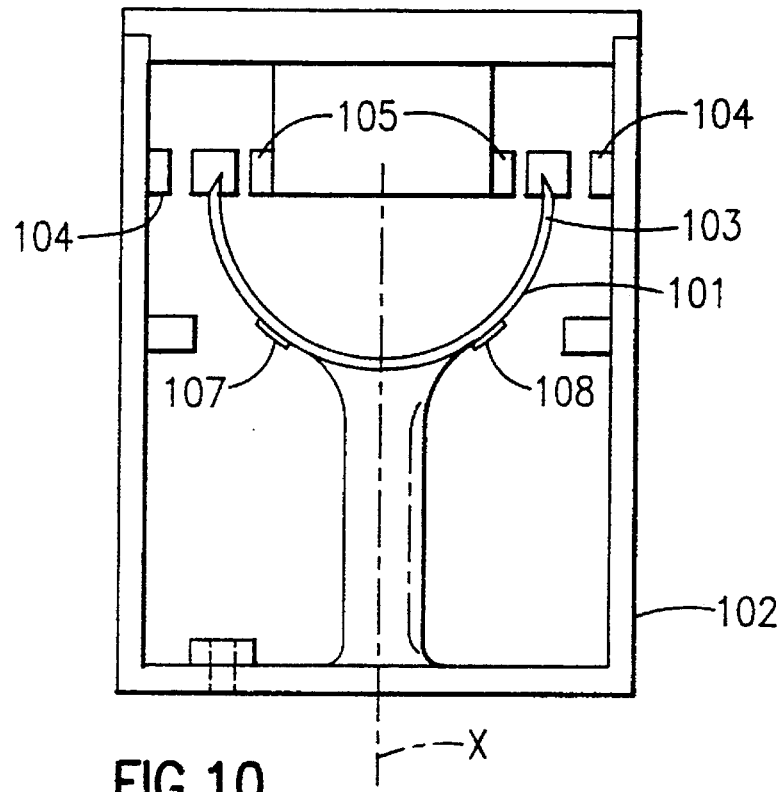
FIGS. 10 and 11 diagrammatic views of a second embodiment.
Figure 11:
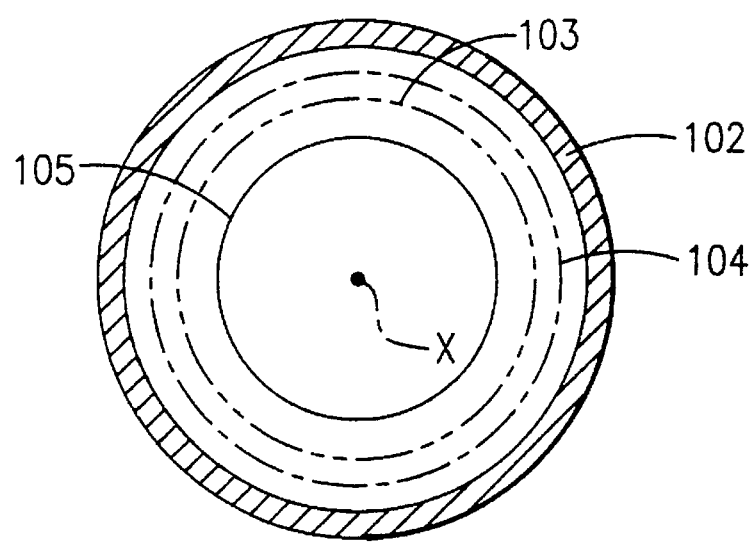

FIG. 10 is a part sectioned elevation and FIG. 11 a plan view form above of a gyroscopic unit. A resonatable hemisphere 101 manufactured from a piezoelectric material (in this case quartz though a material such as a PZT ceramic could be used) and located in a closed and evacuated housing 102. Rim 103 of the hemisphere 101 is located in an annulus bounded on its outside by an array 104 of discrete forcers electrodes and on its inside by a complimentary array 105 of forcer electrodes. The arrays 104, 105 are mounted at the same horizontal level as rim 103. The hemisphere 101 has mounted on it SAW resonator devices 107, 108 which can be coupled by, respectively, probes 109, 110 mounted on the walls of housing 102 to a source of input energy and frequency sensors. Cable outlet 111 provides an airtight passage for cables into the housing connected to forcer electrodes arrays 104, 105 and probes 109, 110.

Hemisphere 101 is brought to a resonant condition by way of forcer electrodes arrays 104, 105. The hemisphere 101 is then rotated about axis X and it is known that an imposed strain pattern will rotate relative to the hemisphere 101 at one third of the rate of rotation of the hemisphere. During resonance opposite points on the rim 103 of the hemisphere 101 will move outwardly while opposite points 90 degrees around the rim 103 move inwardly so generating strain in the hemisphere. The process then reverses. By locating SAW resonators 107, 108 with an angular separation of 90 degrees around the hemisphere 101 this strain can be detected by one SAW resonator 107 in compressive strain and the resonator 108 in tensile strain to establish the null strain position. Such a gyroscopic device has a number of navigational and guidance applications. In particular by manufacturing the hemisphere 101 in a piezoelectric material the SAW resonators 107, 108 directly onto the body of the hemisphere 101. The use of SAW resonators in this application provides for high sensitivity and good frequency response. They enable a much smaller resonator to be manufactured than one using a lower resonance frequency and capacitive detection of the null position. As a consequence the strain and temperature information derived from such an assembly could be used to improve the performance of gyroscopic devices. A third SAW resonator can be located on the hemisphere 101 to provide a signal indicative of the direction of motion of strain pattern.

FIG. 12, 13, 14

These show the use of an SAW resonator to measure pressure change by making attaching SAW resonators to a diaphragm which is subject to the pressure change. Typically the diaphragm has one resonator on one side in tension and another resonator on the other side in compression.. The signals are then mixed to produce temperature compensation for the strain output in a manner akin to that described in relation to FIG. 8 where the sum output from mixer MP provided a temperature signal. Various methods of coupling can be used.

Figure 13:
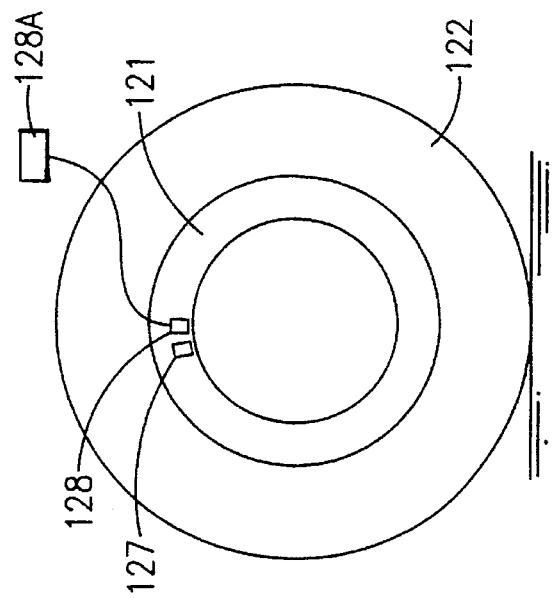
Figure 12:
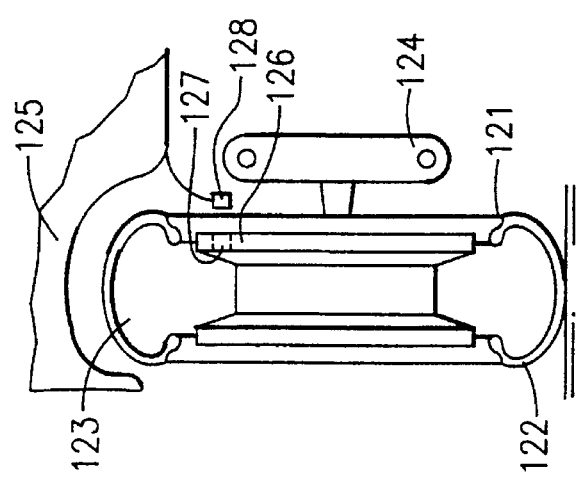
Figure 15:
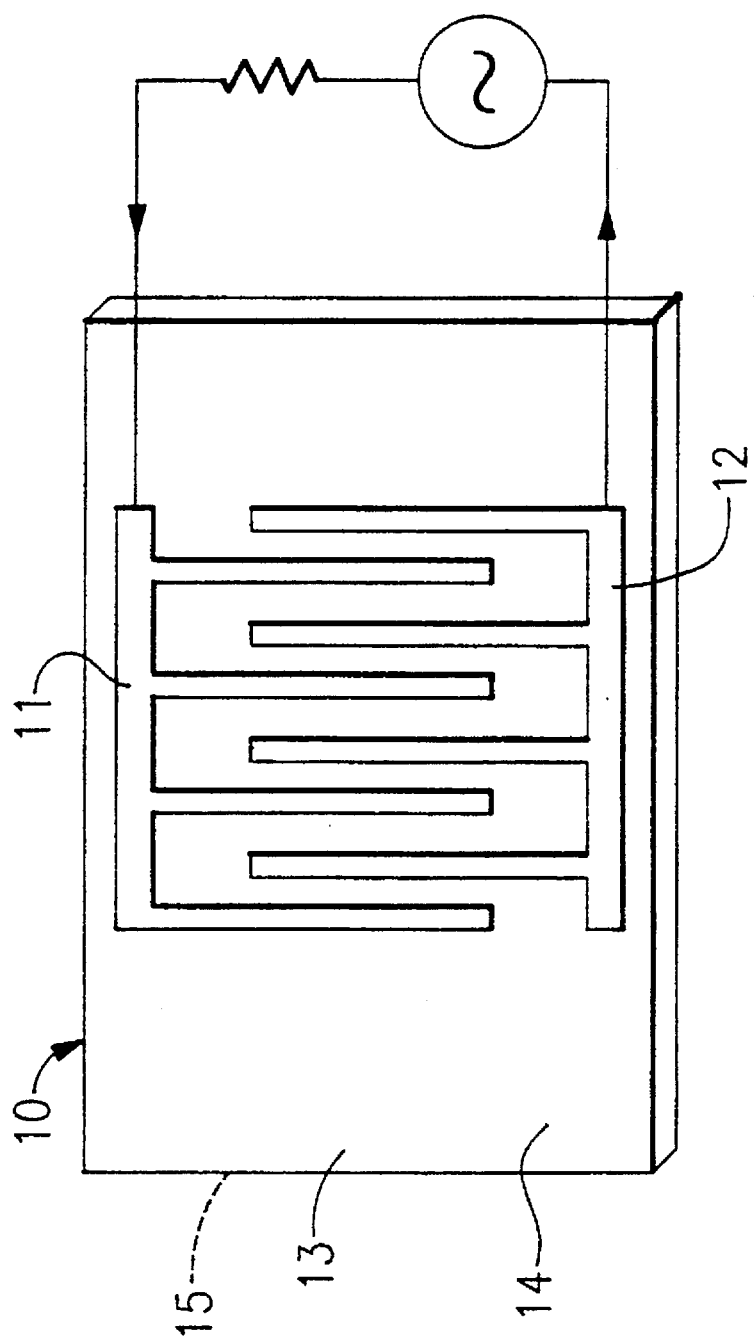
FIG. 15 is a diagram of an SAW device.

FIGS. 12, 13 show a car wheel 121 on which is mounted a pneumatic tire 122 (shown in section in FIG. 12) whose interior 123 is inflated to a predetermined pressure. The wheel 121 is mounted in a known manner on a suspension unit 124 attached to car body 125. On wheel rim 126 there is mounted an SAW resonator transducer assembly 127 which is described in more detail in relation to FIG. 14. Output signals from the assembly 127 are periodically sensed by way of probe 128 coupled to a processor 128A mounted on structure of the car body in the vicinity of the wheel 121. In FIG. 13 the assembly 127 is shown angularly offset from probe 128.

Figure 14:
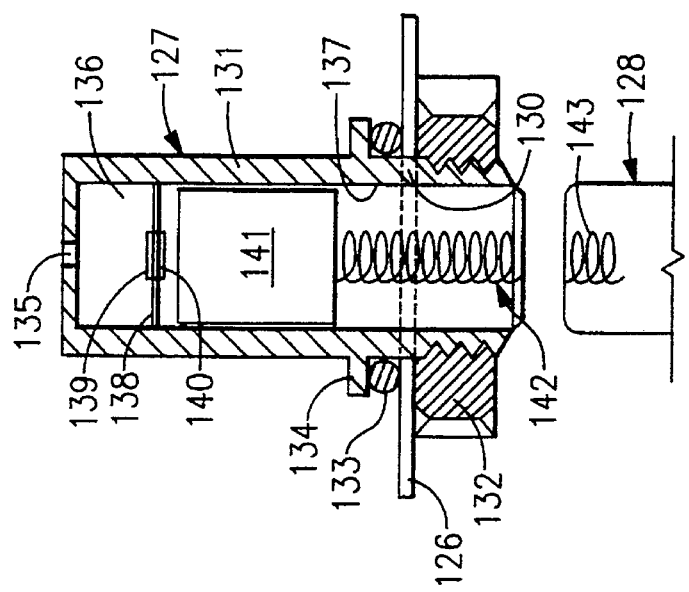
FIG. 12, 13 and 14 are diagrammatic views of a third embodiment.

FIG. 14 shows the juxtaposed transducer assembly 127 and the probe 128 in more detail. Wheel rim 126 is pierced by aperture 130 through which extends body 131 of the assembly 127 into the interior 123 of the tire. The body 131 is secured on the rim 126 by way of nut 132 and O-ring 133 serves to maintain a fluid tight seal between flange 134 integral with body 131 and the rim 126. The body 131 has an end aperture 135 opening into cavity 136. The cavity 136 is isolated from the remainder of bore 137 in the body 131 by a flexible diaphragm 138. The diaphragm 138 has SAW resonator transducer 139 deposited on its upper side and a second transducer 140 deposited on its lower side. Circuit capsule 141 is positioned in bore 137 so as to be adapted to receive and transmit data by way of coil 142 to a corresponding coil 143 mounted in probe 128. The data comprises the output frequencies of resonators 139, 140 adapted to provide diaphragm information as to strain, directly related to tire pressure, and the temperature of air within the tire interior 123 as described in connection with FIG. 8. Various methods are available for coupling the tire operating parameters to a probe. The arrangement described in connection with FIGS. 12, 13, 14 will only produce an output when transducer 127 is in close proximity to probe 128 that is to say once for each revolution of the wheel. With a coil corresponding to that of coil 142 positioned on inner rim 144 of the wheel 121 and a coil corresponding to probe coil 143 mounted around axle 145 then a continuous information output is obtained. Correct operation of the probe is detected by monitoring the signal level. A single readout unit in the vehicle receives the output from pressure transducers of the type described mounted on each of all the wheels of the car. The readout unit provides for the displays of any selected tire pressure and temperature. If necessary the selected reading can be displayed in relation to pre-set operating limits. The exemplary embodiments, and particularly that described in connection with FIG. 8, provide for strain measuring systems offering substantial advantages over existing devices. Apart from information on tire pressure and temperature the tire can incorporate a transducer serving to transmit a signal relating to tire wear by way of the probe system.

The transducer of the present invention in addition to being small in size and capable of very accurate outputs provide for low manufacturing cost and to large scale production. A strain gauge transducer based on the SAW device makes use either of existing components or, as in the case of the SAW itself, of an electrode deposition process which is capable of being manufactured more cheaply and with greater inherent accuracy than existing transducer components (such as resistance gauges or apertured disks). In addition the mounting of the components is more readily achieved than with existing strain gauge or optical torque measuring devices.

In one form the transducer would be encapsulated to protect the electrodes and working circuitry. The transducer is attached to the item whose stressing is of concern typically by welding or adhesive to ensure that the substrate material is as tightly secured as possible so that the maximum transmission of strain occurs from the test piece to the substrate.

An SAW resonator can be made small in size and mass. As a consequence inertia effects are minimal in contrast to currently available systems which in the main involve the mounting of inertially significant components. Because of the low size and mass the system can accommodate a wide variety of operating conditions. The proposed SAW resonator system provides for high accuracy and sensitivity achieved by the use of what amounts to frequency modulating techniques making use of solid state components having high reliability and of low power consumption. The associated control and processing equipment utilise available signal processing methods and components which are readily interfaced with existing digital processes and equipment. Typically in the case of torque measurement there are virtually no limitations imposed by the shaft mounted part of the system on the speed at which the shaft under test can be rotated or at which it can be accelerated or decelerated. The system will also provide valid data from start-up from zero shaft speed on start up and for very low shaft speeds.

The proposed SAW resonator system of the present invention is inherently safe since only signal strength power is used. This contrasts with, for example, currently available torque measurement by way of an optical system requiring the use of sufficient power for a plurality of lamps.

We claim:

1. A method of measuring dynamic torque in a rotatable shaft wherein at least a pair of surface acoustic wave generators are disposed on a substrate, and are disposed to distort in response to the torque to be measured such that the distortion serves to alter the frequency control of the surface acoustic wave generator with a consequent change in output frequency comprising the steps of:

a) locating on a shaft (S) a pair of transducers (T1, T2), each comprising an SAW resonator, mounted as a complementary pair so that for a first direction of rotation (K) of the shaft (S) about an axis (A) a first transducer (T1) is under compression and the second transducer of said pair (T2) is in tension, a signal input (C1) and a signal output (C2,C3) for each transducer, the signal input and signal outputs being located at discrete locations, said discrete locations being one of on and near an outside of the shaft for rotation therewith;

b) causing a driving signal to be applied to the signal input (C1), which is carried out by way of a signal transmitter (P1) coupled to the signal input by one of an inductive, capacitive and radio wave means of low power;

c) detecting at each signal output (C2,C3) at least an output resonant frequency of the corresponding transducer (T1, T2) when driven by the driving signal by way of a signal receiver (P2) coupled to the signal outputs (C2,C3) by way of one of an inductive, capacitive and radio wave means of low power; and d) processing the output resonant frequency signal from each transducer (T1, T2) to derive information as to the strain generated in the transducers (T1, T2) induced by stress in the shaft (S) due to dynamic torque transmitted by the shaft (S).

2. A method of measuring dynamic torque according to claim 1 wherein the step of detecting an output resonant frequency from the first transducer (T1) provides a first signal frequency and the output resonant frequency (F1) from the second transducer (T2) provides a second signal frequency (F) at least one of the first and the second signals being processed (R1, R2) prior to a mixing process (M).

3. Apparatus for measuring dynamic torque transmitted by a shaft having an axis of rotation wherein a pair of transducers, each comprising an SAW resonator, are located relative to a shaft as a complementary pair comprising:

a pair of transducers (T1, T2) being located on the shaft;

a signal input (C1) comprising a signal transmitter (P1) coupled to the signal input (C1) by one of an inductive, capacitive and radio wave means of low power;

a signal output (C2) comprising a signal receiver (P2) coupled to the signal output (C2) by way of one of an inductive, capacitive and radio wave means of low power, each transducer being located at discrete locations, said discrete locations being one of on and near the outside of the shaft (S) for rotation therewith, each transducer (T1, T2) comprising a piezoelectric substrate (13) having mounted on one side a pair of interdigitated electrodes (11, 12), a first electrode (11) of the pair being connected to the signal input (C1);

a generator (A1, A2) for applying an input signal at a predetermined frequency (F1, F2) to the signal input (C1);

a signal processing mixer (M) for receiving a signal from the signal output (C2); and a processor (R) whereby changes in the output signal arising from strain applied to the substrate (13) can be derived.

4. Apparatus for measuring dynamic torque according to claim 3 wherein the signal processing mixer (M) is adapted to receive the output resonant frequency (F1) from a first transducer (T1) and the output resonant frequency (F2) from the second transducer of said pair (T2) and to mix both signals to produce a composite signal derived from both the signals (F1, F2).

5. Apparatus for measuring dynamic torque according to claim 3 wherein the signal processing mixer (M) provides signal outputs of a sum and a difference signal derived from the outputs of the transducer pair (T1, T2), the difference signal being a function of measured torque, and the sum signal being a function of the ambient temperature in the region of the transducers.

6. Apparatus for measuring dynamic torque according to claim 5 wherein the difference signal and the sum signal are fed to a common processor (MP).

7. Apparatus for measuring dynamic torque according to claim 3 wherein the transducers (91, 92), generators (93, 94), and a mixer (95) are packaged as a unit for mounting on a shaft whose torque is to be measured, the signal outputs from each transducer being combined by way of the mixer and thereafter fed to a common output unit (97) for transmission from the unit (95).

* * * * *